United States Patent [19]

Lebby et al.

[11] Patent Number: 5,116,461
[45] Date of Patent: May 26, 1992

[54] METHOD FOR FABRICATING AN ANGLED DIFFRACTION GRATING

[75] Inventors: Michael S. Lebby; Michael P. Norman, both of Chandler, Ariz.

[73] Assignee: Motorola, Inc., Schaumburg, Ill.

[21] Appl. No.: 688,763

[22] Filed: Apr. 22, 1991

[51] Int. Cl.[5] .................. H01L 21/306; B44C 1/22; B29C 37/00; C03C 15/00
[52] U.S. Cl. ......................... 156/643; 156/633; 156/654; 156/659.1; 156/662; 156/663; 156/668; 204/192.34; 359/569
[58] Field of Search ............. 156/633, 643, 647, 654, 156/659.1, 662, 663, 668; 204/192.32, 192.36, 192.37, 192.34; 350/162.16, 162.17, 162.19, 162.2, 162.23, 162.24

[56] References Cited

U.S. PATENT DOCUMENTS 4,405,405  9/1983  Fujii et al. ..................... 156/633

OTHER PUBLICATIONS

Norman, "Microwave Plasma Boosted Chemically Assisted Ion Beam Etching System for Sculpting Integrated Optoetronic Devices and Circuits", *Thesis*, Jun. 1990.

*Primary Examiner*—William A. Powell
*Attorney, Agent, or Firm*—Joe E. Barbee

[57] ABSTRACT

A method for fabricating an angled diffraction grating (12) is provided. An optical medium (13) with fine lines and spaces that are defined in an etch mask is provided. Transferring the defined lines and spaces of the etch mask into the optical medium (13) at a desirable angle is achieved by an etching means, thereby resulting in an angled diffraction grating (12).

20 Claims, 1 Drawing Sheet

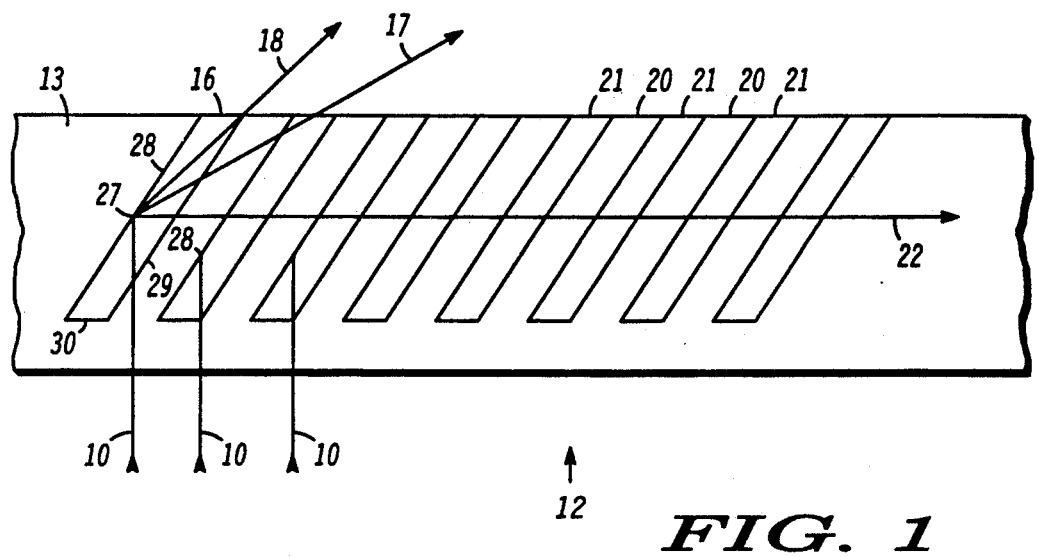
FIG. 1
FIG. 2
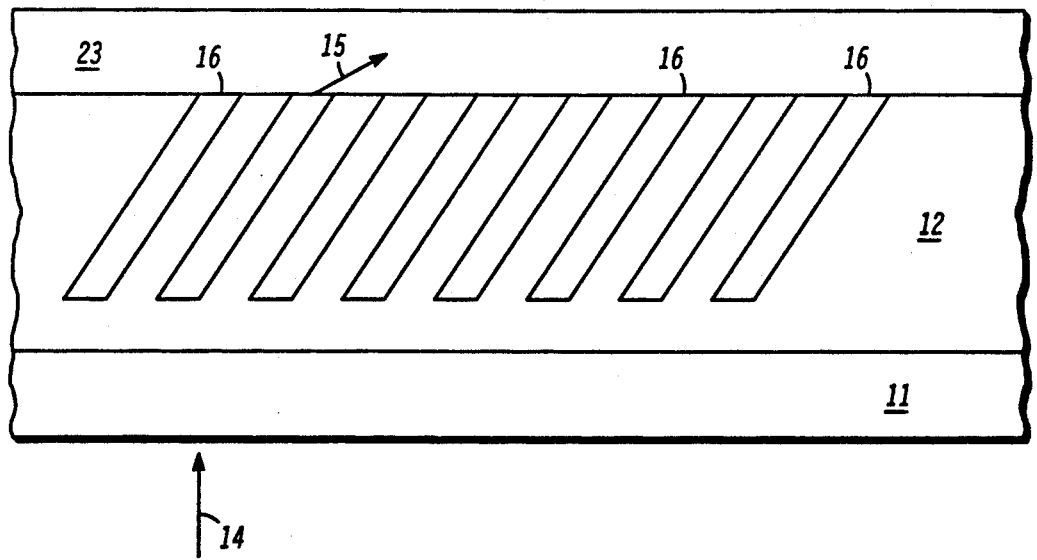

METHOD FOR FABRICATING AN ANGLED DIFFRACTION GRATING

BACKGROUND OF THE INVENTION

This invention relates, in general, to optical devices, and in particular, to diffraction gratings.

Diffraction gratings have been made and used for a long time. Generally, diffraction gratings are vertical parallel periodic structures. Spacing of these vertical parallel structures is usually on the order of a wavelength of an illumination source. When commonly used, the diffraction grating is illuminated by optical electromagnetic radiation, resulting in a spectra being produced. Recently, diffraction gratings have begun to be investigated for use with semiconductor products.

Conventionally, vertical diffraction gratings that are used with semiconductor products are manufactured by treating a photopolymer film with two light sources. Generally, these light sources originate from a single laser beam that has been split into two halves to form two beams. The two beams are then redirected onto the photopolymer film so that the two beams meet at the same area on the photopolymer film. By directing the two beams onto the photopolymer film, constructive and destructive waves are formed that periodically change the photopolymer film chemically in some areas, but do not chemically change the photopolymer film in other areas, thereby producing the vertical diffraction grating in the photopolymer film. The vertical diffraction grating that is produced, however, has several major problems, such as not being sufficiently sensitive, being able to produce only vertical periodic structures, and not being able to be integrated easily into semiconductor products.

Efficiency of a diffraction grating is measured by comparing an amount of light that is diffracted by the grating to an amount of light that is directed into the grating. The inefficiency of conventional diffraction gratings generally are due to a small refractive index difference between the periodic structures that are formed in the diffraction gratings. Using the conventional method of fabricating a diffraction grating, it is very difficult to increase or to change the differences of refractive indexes between the periodic structures of the photopolymer film. Further, sharp clear-cut divisions between the periodic structures are not possible to produce with the conventional process, thus further reducing the efficiency of the diffraction grating.

Additionally, the conventional diffraction gratings that are manufactured with the photopolymer film do not allow for any profile modification of the periodic structures. This inability to modify the profile of the periodic structures further curtails or restricts using conventional diffraction gratings, as well as modifying the sensitivity of conventional diffraction gratings.

It can be seen that conventional methods for producing diffraction gratings have several limitations. Also, it is evident that conventional diffraction grating structures are not capable of fulfilling recent requirements that are needed for use in semiconductor products, because conventional diffraction gratings are not easily integrated into semiconductor products. Therefore, a method for making an angled diffraction grating would be highly desirable.

SUMMARY OF THE INVENTION

Briefly, according to the invention, a method for fabricating a parallel walled angled diffraction grating is provided. An optical medium is patterned with fine lines and spaces. Etching the fine lines and spaces is achieved by an etching means which produces parallel walled angled trenches in the optical medium that was defined by the fine lines and spaces, thereby producing a parallel walled angled diffraction grating.

BRIEF DESCRIPTION OF THE DRAWINGS

FIG. 1 illustrates a simplified cross section of a parallel walled angled diffraction grating; and FIG. 2 illustrates the invention of FIG. 1 with an optical layer and a wave guide.

DETAILED DESCRIPTION OF THE DRAWINGS

FIG. 1 illustrates a simplified cross section of a parallel walled angled diffraction grating 12. Diffraction grating 12 is illustrated with incident light 10 being directed into the diffraction grating 12. Incident light 10 is illustrated by arrows for the sake of simplifying FIG. 1, however, incident light 10 also acts as waves that are directed into and out of diffraction grating 12. Incident light source 10 can originate from several different sources, such as light emitting diodes, lasers, or the like. Diffraction grating 12 is made by etching a plurality of parallel walled angled trenches 16 into an optical medium 13. Optical medium 13 is a material that does not absorb light at desirable wavelengths of incident light 10. In a preferred embodiment, optical medium 13 is a polymer; however, optical medium 13 can also be made of a variety of materials, including, but not limited to, quartz, glass, semiconductors, and III-V compound semiconductors.

To etch angled trenches 16 optical medium 13 is patterned by well-known methods in the semiconductor art. Typically, this pattern is defined by a photoresist material that has been applied, exposed, and developed on a thin silicon dioxide etch mask, which is then used to transfer the pattern into optical medium 13. Additionally, sometimes the photoresist pattern serves as an etch mask to etch optical medium 13. It should be understood that other patterning techniques are capable of being used, such as tri-level photoresist techniques, or the like. The pattern in the photoresist material generally is a plurality of fine parallel lines of photoresist and a plurality of fine parallel spaces. The plurality of fine parallel spaces in between the fine parallel lines leaves optical medium 13 open and clear of any photoresist or pattern material.

Geometric dimensions and shapes of diffraction grating 12 are variable. Typically, size dimensions of diffraction grating 12 is dependent upon sizing of incident light source 10, but can range from 2.0 microns to 6.0 microns in size, with shapes ranging from circular to rectangular.

To etch angled trenches 16 other pattern variations are used to modulate and to correct for optical aberrations, such as narrowing the spaces in between the lines on the outer portions of the pattern or having the parallel lines of equal width, but the spacing variable or incremental. Typically, dimensions of lines and spaces of diffraction grating 12 are on an order of a wavelength of incident light 10; therefore, lines and spaces range between 0.02 micron (200 angstroms ) to 1.0 micron (10,000 angstroms).

The photoresist pattern is then used either as an etch mask itself or is used to etch and produce a more resilient etch mask. It should be understood that an etch sample is comprised of at least the etch mask and optical layer 13; however, other materials, layers, and substrates can also be included. The etch mask protects certain portions of optical medium 13 during the etch, while allowing other areas of optical medium 13 to be exposed and etched away.

Once the etch mask is on optical medium 13, the pattern of lines and spaces of the etch mask is etched into optical medium 13. The etching removes portions of optical medium 13 that are exposed, so that angled parallel trenches 16 are formed. Generally, angled parallel trenches 16 have high aspect ratios that range between 2 to 30. Aspect ratio, in this example, is calculated by the following equation:

$$D/W = \text{Aspect Ratio}$$

where D is the depth of trench 16, and W is the width of trench 16. Dimensional control of angled parallel trenches 16 is maintained by etching in an anisotropic manner, resulting in parallel walls 28 and 29 with dimensions that are the same or only slightly different from the exposed area of the etch mask. By angle etching of trench 16, parallel walls 28 and 29 and bottom 30 are formed with a desired angle. Bottom 30 of trench 16 can either be rounded or flat.

Typically, etching of angled trenches 16 is made by a method called Ion Beam Activated Gas Surface Chemistry (IBAGSC). It is believed that angle etching by the IBAGSC method is achieved by tilting the etch sample, while a down-stream plasma reactor, typically a microwave reactor, injects plasma ions onto the etch sample. A directional ion beam, such as an argon ion beam, travels through the injected ions and strikes the etch sample at an angle. It is also believed that the ion beam travels through the injected plasma ions and strikes the etch sample with sufficient energy to initiate a chemical reaction with the plasma ions and the etch sample. However, it should be understood that actual output composition of the microwave reactor is not well understood in detail. It is further believed that a limited reaction site or area is achieved because chemical activation occurs where the etch sample is exposed, and plasma ions are chemically near, and where the ion beam strikes the surface of the etch sample. Although the depth of angled trenches 16 range from 0.5 micron to 10.0 microns, typically, angled trenches 16 are adjusted to a depth of 1.5 microns. Angles that are capable of being etched range from 80 degrees to 0 degrees, with 0 degrees being normal or vertical to the substrate surface or optical medium 13. Being able to select the angle at which the angled trenches 16 will be etched results in being able to direct diffracted light in a desirable direction.

By way of example, angled trenches are made by transferring the pattern from the silicon dioxide etch mask to the polyimide polymer using the IBAGSC method. In this particular example, the neutralized ion beam is made of argon ions and electrons, and the plasma ions that are injected onto the surface of the etch sample are made of oxygen. The IBAGSC system holds the etch sample to the desired angle. The ion beam is directed at the tilted etch sample, while the ions from the down-stream microwave plasma generator are injected onto optical medium 13. Having the argon ions strike the etch sample while oxygen ions are chemically near or at the reaction area causes etching of the polyimide film 13. Etching of polyimide film 13 is continued until a desired depth is obtained. It should be understood that diffraction grating 12 can be etched totally through optical medium 13, as well as only partially etched as illustrated. Typically, the depth of angled trench 16 ranges between 10 to 20 times the width. Once diffraction grating 12 is etched to the desired depth, a parallel walled angled diffraction grating is achieved. Polyimide film 13 is typically cleaned to remove the etch mask. Ordinarily a heated wet solvent solution is used to clean diffraction grating 12; however, other solutions can be used depending on the material used to make diffraction grating 12.

Incident light 10 is directed toward diffraction grating 12. It should be understood that arrows of incident light 10 and arrows of diffracted light 17, 18, and 22 are merely illustrations in order to simply the complex interactions of incident light 10 in diffraction grating 12. Arrows 17, 18, and 22 illustrate the direction at which incident light 10 is diffracted depending upon the angle of parallel wall 28. By way of example, having parallel wall 28 at a 45 degree angle incident light 10 generally is diffracted in along arrow 22; however, by changing the angle of parallel wall 28 to 30 degrees incident light 10 generally is diffracted along arrow 18. Generally, incident light 10 enters diffraction grating and follows principles pertaining to diffractive optics. Diffraction arrows 22, 18, and 17 illustrate a construction of interactions that occur depending upon the angle of parallel walls 28 and 29. Generally, incident light 10 passes though the bottom of optical medium 13 and into diffraction grating 12. Lines 20 and spaces 21 in diffraction grating 12 have typical dimensions of a first order diffraction grating. It should be understood that lines 20 are a result of removal of optical medium 13 from around the etch mask leaving lines of optical medium 13 behind, whiles spaces 21 are a result of the removal of optical medium 13 from the openings or clear areas in the etch mask. A diffraction pattern, formed of light and dark areas, is directed out of the diffraction grating 12. The patterns can be formed into many different geometric patterns, such as spaced dots, lattices, and grids. Knowing and using the refractive index of the various material systems that are to be utilized enables further control of diffraction grating 12.

Angled trench 16, typically, is filled with a material that has a refractive index that is different from that of optical medium 13. Selecting a suitable filling material can create dramatic differences between optical medium 13 and angled trench 16, thus providing greater efficiency and performance of diffraction grating 12. Generally, the filling of angled trench 16 is achieved by methods, such as capillary injection techniques. By using a material, such as optically prepared spin on glass (SOG) to fill angled trenches 16, an increase in efficiency and in performance of diffraction grating 12 is obtained. However, filling of angled trench 16 is not necessary in some applications.

Incident light 10 passes through angled trench 16 striking diffracting wall 28 of angled trench 16. Point 27 is used to illustrate one point, but there are many points at which incident light 10 strikes diffracting wall 28. Diffracted light is illustrated by arrow lines 17, 18, and 22. Diffracted light 17 is diffracted at a different angle from diffracted light 18 or from diffracted light 22. Angle of diffracted light 17, 18, and 22 is determined predominantly by the angle of diffracting walls 28 and 29. In a preferred embodiment, the angle of diffracting wall 28 is an acute angle, so that light 10 is diffracted out and away from the diffraction gradient. By way of example, etching angled trenches 16 at an angle of 30 degrees, thereby providing diffracting wall 28 with a 30 degrees angle, diffracts and directs incident light 10 away from diffracting wall 28 through optical medium 13, illustrated by light beam 17. Therefore, it can be seen that by choosing an appropriate etching angle incident light 10 can be directed or diffracted in a desirable direction.

FIG. 2 illustrates a simplified cross section of the parallel walled angled diffraction grating that was described in FIG. 1 with an addition of a waveguide 23 and an optical layer 11.

Waveguide 23 captures light diffracted from diffraction grating 12 and guides the diffracted light away from the diffraction grating 12. Generally, waveguide 23 is made of an optical medium, such as gallium arsenide or indium phosphide that is laminated to diffraction grating 12. Also, by adjusting the angle of parallel walled trenches 16 as described in FIG. 1, diffraction of light source 14 can be adjusted so that diffracted light 15 enters waveguide 23 and is also totally internally reflected, thus allowing diffracted light to be further directed away from diffraction grating 12.

Optical layer 11 generally is made of optically transparent material, such as quartz, sapphire, or polymer. Optical layer 11 can offer a multitude of functions, such as a filter, a lense, or a supporting medium. Typically, optical layer 11 is affixed to diffraction grating 12 by a lamination technique, such as molecular bonding.

By now it should be appreciated that there has been provided a unique method for fabricating an angled diffraction grating. Additionally, it should be realized that a method to direct light by diffraction has also been provided.

We claim:

1. A method for fabricating an angled diffraction grating comprising:
   providing an optical medium that is patterned with fine lines and spaces; and
   etching the fine lines and spaces into the optical medium by an etching means to produce parallel walled angled trenches in the optical medium, thereby producing an angled diffraction grating.

2. The method of claim 1 further including using a polymer for the optical medium.

3. The method of claim 1 further including using a semiconductor substrate for the optical medium.

4. The method of claim 3 further including using a III-V compound semiconductor for the semiconductor substrate.

5. The method of claim 3 further including using silicon for the semiconductor substrate.

6. The method of claim 1 further including patterning the optical medium with lines and spaces that range between 0.02 micron to 1.0 microns in width.

7. The method of claim 1 further including etching the angled trenches to a depth of between 0.5 micron to 10.0 microns.

8. The method of claim 7 further including etching the angled trenches to substantially a depth of 1.5 microns.

9. The method of claim 1 further including etching the angled trenches to an angle between greater than 0 degrees to 80 degrees from normal.

10. The method of claim 9 further including etching the angled trenches to substantially 30 degrees from normal.

11. The method of claim 1 further including making the angled trenches with an aspect ratio of between 2 and 30.

12. A method for fabricating a polymer angled diffraction grating comprising:
    providing an optical medium that is a polymer, with a substrate that is optically transparent;
    patterning the polymer with fine lines and fine spaces; and
    etching the polymer, so that the fine lines are etched in the polymer at a desirable angle producing parallel walled angled trenches which form a diffraction gradient.

13. The method of claim 12 further including using gallium arsenide for the optically transparent substrate.

14. The method of claim 12 wherein the fine line are between 0.02 micron to 1.0 microns.

15. The method of claim 12 further including etching the angled trenches to substantially 1.5 microns.

16. The method of claim 12 further including etching the angled trenches to substantially 30 degrees from normal.

17. A method for directing a incident light source from a first angle to a second angle comprising:
    providing a incident light source with a first angle;
    having the incident light source strike a parallel walled angled diffraction grating; and
    defracting the incident light source from the parallel walled angled diffraction grading, thereby directing the the incident light source to a second angle.

18. The method of claim 17 further including having the incident light source originate from at least one laser.

19. The method of claim 17 further including having the incident light being directed into a waveguide.

20. A method for making a parallel walled diffraction grating comprising:
    patterning a surface of an optical medium;
    exposing the patterned optical medium to at least plasma ions and a directional ion beam; and
    striking the optical medium with the ion beam, thereby allowing the plasma ions to react with the patterned surface at an angle.

* * * * *